(12) United States Patent
Sugiyama (10) Patent No.: US 11,719,598 B2
(45) Date of Patent: Aug. 8, 2023

(54) OPTICAL DEVICE FOR MEASURING POWER OF TEST LIGHT AND OPTICAL DEVICE TESTING METHOD

(71) Applicant: Fujitsu Optical Components Limited, Kawasaki (JP)

(72) Inventor: Masaki Sugiyama, Kawasaki (JP)

(73) Assignee: FUJITSU OPTICAL COMPONENTS LIMITED, Kawasaki (JP)

(*) Notice: Subject to any disclaimer, the term of this patent is extended or adjusted under 35 U.S.C. 154(b) by 289 days.

(21) Appl. No.: 17/128,942

(22) Filed: Dec. 21, 2020

(65) Prior Publication Data

US 2021/0270697 A1 Sep. 2, 2021

(30) Foreign Application Priority Data

Mar. 2, 2020 (JP) ................................ 2020-035319

(51) Int. Cl.
| | |
|---|---|
| G01M 11/00 | (2006.01) |
| G02B 6/27 | (2006.01) |
| G02B 6/125 | (2006.01) |
| G02B 6/34 | (2006.01) |
| G02B 6/12 | (2006.01) |

(52) U.S. Cl.
CPC ............ G01M 11/33 (2013.01); G02B 6/125 (2013.01); G02B 6/2773 (2013.01); G02B 6/34 (2013.01); *G02B 2006/12061* (2013.01)

(58) Field of Classification Search
CPC ................................ G01M 11/33; G02B 6/34
See application file for complete search history.

(56) References Cited

U.S. PATENT DOCUMENTS

| | | | |
|---|---|---|---|
| 9,459,177 B1 | 10/2016 | Dong et al. | |
| 10,365,435 B1 | 7/2019 | Karimelahi et al. | |
| 2017/0346567 A1* | 11/2017 | DeDobbelaere | G02B 6/124 |
| 2019/0293866 A1* | 9/2019 | Novack | G02B 6/124 |
| 2019/0372664 A1* | 12/2019 | Sugiyama | G02B 6/4204 |
| 2020/0044739 A1* | 2/2020 | Sugiyama | G01M 11/33 |

FOREIGN PATENT DOCUMENTS

EP 2137514 B1 * 6/2018 ............. G01N 21/45

* cited by examiner

*Primary Examiner* — Michael A Lyons
(74) *Attorney, Agent, or Firm* — Staas & Halsey LLP (57) ABSTRACT

An optical device includes an optical circuit and a test circuit optically connected to the optical circuit. The test circuit includes a first grating coupler configured to receive test light, a second grating coupler configured to output, as reference light, the test light passed through the first grating coupler, and a first branch coupler connected to an output of the first grating coupler. The first branch coupler includes first output connected to an input of the optical circuit and configured to branch and output the test light from the first grating coupler to the optical circuit. Further, the first branch coupler includes a second output connected to an input of the second grating coupler and configured to branch and output the test light from the first grating coupler to the second grating coupler.

10 Claims, 6 Drawing Sheets

OPTICAL DEVICE FOR MEASURING POWER OF TEST LIGHT AND OPTICAL DEVICE TESTING METHOD

CROSS-REFERENCE TO RELATED APPLICATION

This application is based upon and claims the benefit of priority of the prior Japanese Patent Application No. 2020-035319, filed on Mar. 2, 2020, the entire contents of which are incorporated herein by reference.

FIELD

The embodiment discussed herein is related to an optical device and an optical device testing method.

BACKGROUND

Figure 6:
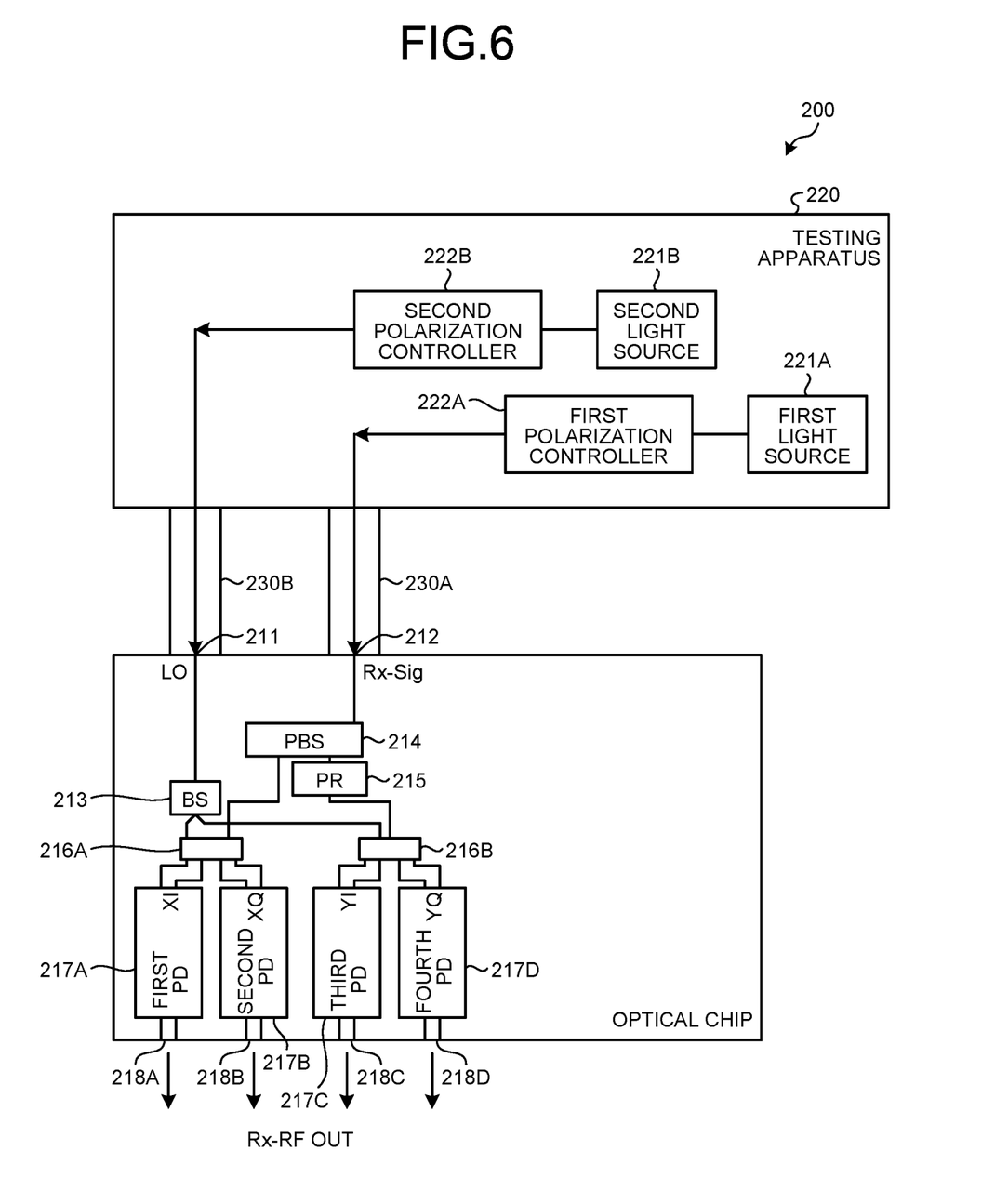
FIG. 6 is an explanatory diagram illustrating an example of a conventional testing system.

FIG. 6 is an explanatory diagram illustrating an example of a conventional testing system 200. The testing system 200 illustrated in FIG. 6 includes an optical chip 210 and a testing apparatus 220. The testing apparatus 220 includes a first light source 221A, a first polarization controller 222A, a second light source 221B, and a second polarization controller 222B.

The first light source 221A is a light source that emits third test light corresponding to reception light, for example. The first polarization controller 222A polarizes the third test light from the first light source 221A, and outputs the polarized third test light to a reception light port 212 within the optical chip 210 by using an optical fiber 230A. Note that the first polarization controller 222A controls polarization of the third test light to generate the third test light of TE-polarization or the third test light of TM-polarization. The second polarization controller 222B polarizes fourth test light from the second light source 221B, and outputs the polarized fourth test light to a local light port 211 within the optical chip 210 by using an optical fiber 230B. Note that the second polarization controller 222B controls polarization of the fourth test light to generate the fourth test light of TM-polarization or the fourth test light of TE-polarization. The reception light port 212 and the local light port 211 are disposed at side-face end parts of the optical chip 210.

The optical chip 210 is an IC chip such as a digital coherent reception part, for example. The optical chip 210 is an optical chip cut out from a wafer. The optical chip 210 includes the local light port 211, the reception light port 212, a BS (Beam Splitter) 213, a PBS (Polarization Beam Splitter) 214, and a PR (Polarization Rotator) 215. Furthermore, the optical chip 210 includes a first optical hybrid circuit 216A, a second optical hybrid circuit 216B, first to fourth PDs (Photo Diodes) 217A to 217D, and first to fourth output ports 218A to 218D.

The local light port 211 is formed in the side-face end part within the optical chip 210, and it is a port that receives local light or the fourth test light corresponding to the local light, for example. Note that the local light port 211 is exposed to the side-face end part of the optical chip 210 when a wafer is cut into chips. The reception light port 212 is formed in the side-face end part within the optical chip 210, and it is a port that receives reception light or the third test light corresponding to the reception light. Note that the reception light port 212 is exposed to the side-face end part of the optical chip 210 when a wafer is cut into chips. The BS 213 splits and outputs the local light from the local light port 211 to the first optical hybrid circuit 216A and the second optical hybrid circuit 216B. The PBS 214 splits the reception light input from the reception light port 212 into two polarization modes orthogonal to each other, such as an X-polarization component and a Y-polarization component. Note that the X-polarization component is a horizontal polarization component, and the Y-polarization component is a vertical polarization component. The PBS 214 outputs the X-polarization component from the reception light to the first optical hybrid circuit 216A. Furthermore, the PR 215 outputs the Y-polarization component from the reception light from the PBS 214 to the second optical hybrid circuit 216B.

The first optical hybrid circuit 216A has the local light interfere with the X-polarization component of the reception light to acquire optical signals of an I-component and a Q-component. Note that the I-component is an in-phase component, and the Q-component is a quadrature component. The first optical hybrid circuit 216A outputs the optical signal of the I-component out of the X-polarization component to the first PD 217A. The first optical hybrid circuit 216A outputs the optical signal of the Q-component out of the X-polarization component to the second PD 217B.

The second optical hybrid circuit 216B has the local light interfere with the Y-polarization component of the reception light to acquire optical signals of the I-component and the Q-component. The second optical hybrid circuit 216B outputs the optical signal of the I-component out of the Y-polarization component to the third PD 217C. The second optical hybrid circuit 216B outputs the optical signal of the Q-component out of the Y-polarization component to the fourth PD 217D.

The first PD 217A performs gain adjustment by electrically converting the optical signal of the I-component of the X-polarization component from the first optical hybrid circuit 216A, and outputs the gain-adjusted electric signal to the first output port 218A. The second PD 217B performs gain adjustment by electrically converting the optical signal of the Q-component of the X-polarization component from the first optical hybrid circuit 216A, and outputs the gain-adjusted electric signal to the second output port 218B.

The third PD 217C performs gain adjustment by electrically converting the optical signal of the I-component of the Y-polarization component from the second optical hybrid circuit 216B, and outputs the gain-adjusted electric signal to the third output port 218C. The fourth PD 217D performs gain adjustment by electrically converting the optical signal of the Q-component of the Y-polarization component from the second optical hybrid circuit 216B, and outputs the gain-adjusted electric signal to the fourth output port 218D.

With the conventional testing method for the optical chip 210, the optical chips 210 are cut out from a wafer, and each optical chip 210 is loaded alone on a stage. Furthermore, an output of the first polarization controller 222A of the testing apparatus 220 and the reception light port 212 at the side-face end part of the optical chip 210 are connected via an optical fiber 230A. Furthermore, the second polarization controller 222B and the local light port 211 at the side-face end part of the optical chip 210 are connected via an optical fiber 230B. Then, the power of the third test light and the power of the fourth test light are measured by using a power meter, not illustrated, and from the measurement result thereof, evaluation of the measurement can be done. Related technologies are described in Patent Document 1: U.S. Pat. No. 9,459,177 and U.S. patent Ser. No. 10/365,435.

However, with the conventional testing method for the optical chip 210, alignment work needs to be performed for aligning the optical axes of the reception light port 212 and the optical fiber 230A as well as the optical axes of the local light port 211 and the optical fiber 230B for each optical chip 210. As a result, work load becomes great when optically connecting the optical chip 210 and the testing apparatus and measuring the power of the test light with respect to the input light.

Furthermore, while the work efficiency may be considered to improve if the optical chips 210 are tested in a wafer state before being cut into chips, light needs to be input by the optical fiber from the wafer surface direction when the test is performed in a wafer state.

SUMMARY

According to an aspect of an embodiment, an optical device includes an optical circuit and a test circuit optically connected to the optical circuit. The test circuit includes a first grating coupler configured to receive test light, a second grating coupler configured to output, as reference light, the test light passed through the first grating coupler, and a first branch coupler connected to an output of the first grating coupler. The first branch coupler includes first output connected to an input of the optical circuit and configured to branch and output the test light from the first grating coupler to the optical circuit. Further, the first branch coupler includes a second output connected to an input of the second grating coupler and configured to branch and output the test light from the first grating coupler to the second grating coupler.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. Note, however, that the disclosed technique is not limited by the embodiment. Furthermore, each aspect of the embodiment illustrated hereinafter may be combined as appropriate within the range not causing conflicts.

Figure 1:
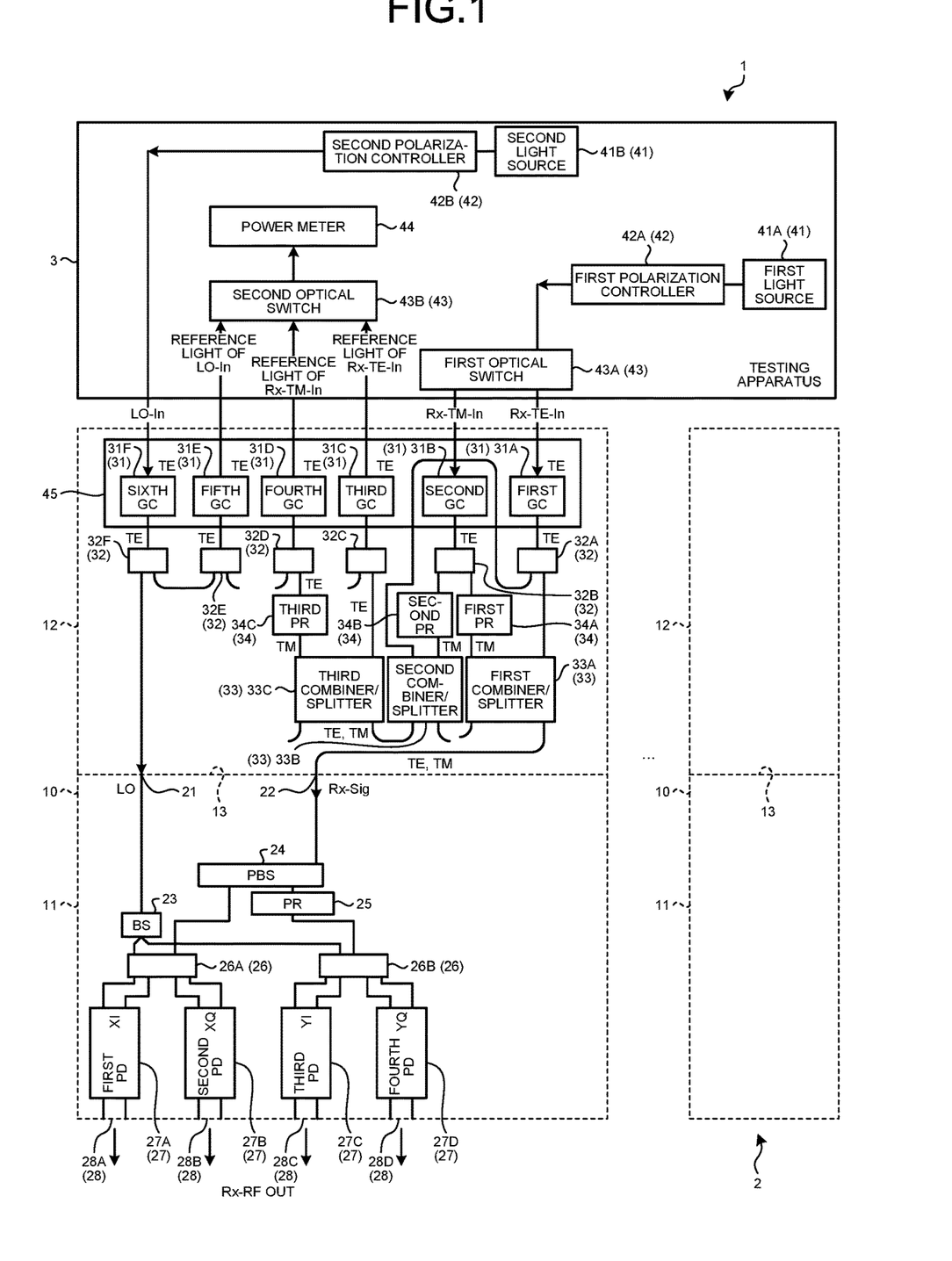
FIG. 1 is an explanatory diagram illustrating an example of a testing system according to an embodiment.
Figure 2:
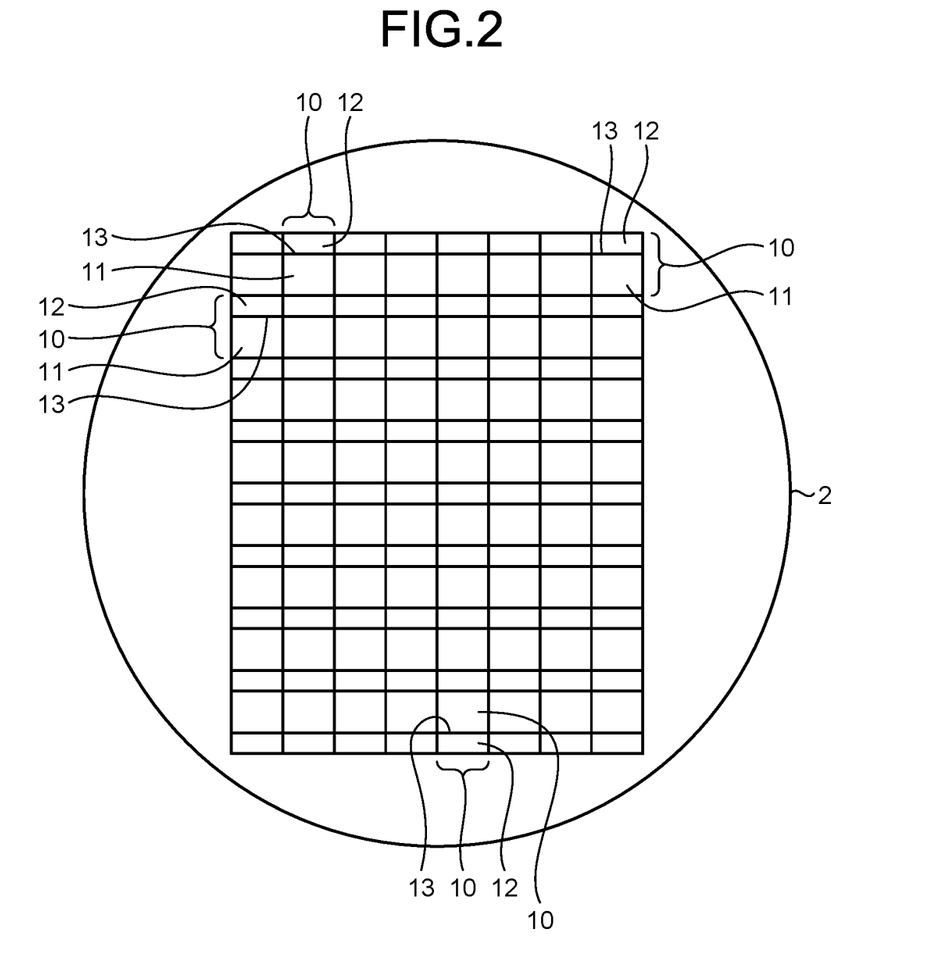
FIG. 2 is a plan view illustrating an example of a wafer where optical chips are formed.

FIG. 1 is an explanatory diagram illustrating an example of a testing system 1 according to the embodiment. The testing system 1 includes a wafer 2 of silicon or the like, for example, where a plurality of optical chips 10 are formed, and a testing apparatus 3. FIG. 2 is a plan view illustrating an example of the wafer 2 where optical chips 10 are formed.

On the wafer 2 illustrated in FIG. 2, a plurality of optical chips 10 are formed while being arranged in a grid-like form. The optical chip 10 is an optical device that includes an optical circuit 11, a test circuit 12, and a dicing line 13 at which the optical circuit 11 and the test circuit 12 can be cut. The test circuit 12 includes a plurality of Grating Couplers (GCs).

The optical circuit 11 includes a local light port 21, a reception light port 22, a Beam Splitter (BS) 23, a Polarization Beam Splitter (PBS) 24, and a Polarization Rotator (PR) 25. The optical circuit 11 includes a first and a second optical hybrid circuits 26, first to fourth Photo Diodes (PDs) 27, and first to fourth output ports 28.

The local light port 21 is a port that receives local light LO emitted from a local light source, for example. The reception light port 22 is a port that receives reception light Rx-Sig, for example. The BS 23 splits and outputs the local light from the local light port 21 to the first optical hybrid circuit 26A and the second optical hybrid circuit 26B. The PBS 24 splits the reception light input from the reception light port 22 into two polarization modes orthogonal to each other, such as an X-polarization component of Transverse Electric (TE) polarization and a Y-polarization component of Transverse Magnetic (TM) polarization. Note that the X-polarization component is a horizontal polarization component, and the Y-polarization component is a vertical polarization component. The PBS 24 outputs the X-polarization component from the reception light to the first optical hybrid circuit 26A. Furthermore, the PR 25 polarizes the Y-polarization component from the reception light from the PBS 24, and outputs the polarized Y-polarization component to the second optical hybrid circuit 26B.

The first optical hybrid circuit 26A has the local light interfere with the X-polarization component of the reception light to acquire optical signals of an I-component and a Q-component. Note that the I-component is an in-phase component, and the Q-component is a quadrature component. The first optical hybrid circuit 26A outputs the optical signal of the I-component out of the X-polarization component to the first PD 27A. The first optical hybrid circuit 26A outputs the optical signal of the Q-component out of the X-polarization component to the second PD 27B.

The second optical hybrid circuit 26B has the local light interfere with the Y-polarization component of the received light to acquire optical signals of the I-component and the Q-component. The second optical hybrid circuit 26B outputs the optical signal of the I-component out of the Y-polarization component to the third PD 27C. The second optical hybrid circuit 26B outputs the optical signal of the Q-component out of the Y-polarization component to the fourth PD 27D.

The first PD 27A performs gain adjustment by electrically converting the optical signal of the I-component of the X-polarization component from the first optical hybrid circuit 26A, and outputs the gain-adjusted electric signal to the first output port 28A. The second PD 27B performs gain adjustment by electrically converting the optical signal of the Q-component of the X-polarization component from the first optical hybrid circuit 26A, and outputs the gain-adjusted electric signal to the second output port 28B.

The third PD 27C performs gain adjustment by electrically converting the optical signal of the I-component of the Y-polarization component from the second optical hybrid circuit 26B, and outputs the gain-adjusted electric signal to the third output port 28C. The fourth PD 27D performs gain adjustment by electrically converting the optical signal of the Q-component of the Y-polarization component from the second optical hybrid circuit 26B, and outputs the gain-adjusted electric signal to the fourth output port 28D.

The testing apparatus 3 includes a first and a second light sources 41, a first and a second polarization controllers 42, a first and a second optical switches 43, a power meter 44, and an optical fiber array 45. The first light source 41A is an LD that emits first test light corresponding to reception light. The first polarization controller 42A polarizes the first test light from the first light source 41A. In a case where input light of a first GC 31A and input light of a second GC 31B are the input light of TM-polarization, the coupling loss tends to increase. Thus, the input light is desirable to be of TE-polarization. Therefore, the first polarization controller 42A performs TE-polarization on the first test light from the first light source 41A, and outputs the first test light of TE-polarization. The first optical switch 43A outputs, in a switchable manner, the first test light of TE-polarization from the first polarization controller 42A to the first GC 31A or to the second GC 31B on the test circuit 12 within the optical chip 10 on the wafer 2.

The second light source 41B is an LD that emits second test light corresponding to local light. The second polarization controller 42B polarizes the second test light from the second light source 41B. In a case where input light of a sixth GC 31F is the input light of TM-polarization, the coupling loss tends to increase. Thus, the input light is desirable to be of TE-polarization. Therefore, the second polarization controller 42B performs TE-polarization on the second test light from the second light source 41B, and outputs the second test light of TE-polarization. The second optical switch 43B is connected to the input of the power meter 44 as well as to the outputs of the third to fifth GCs 31C, 31D, and 31E within the test circuit 12, and outputs reference light for the test light from the third to fifth GCs 31C, 31D, and 31E to the power meter 44. The power meter 44 measures the power of each reference light according to switching operations of the second optical switch 43B.

Figure 3:
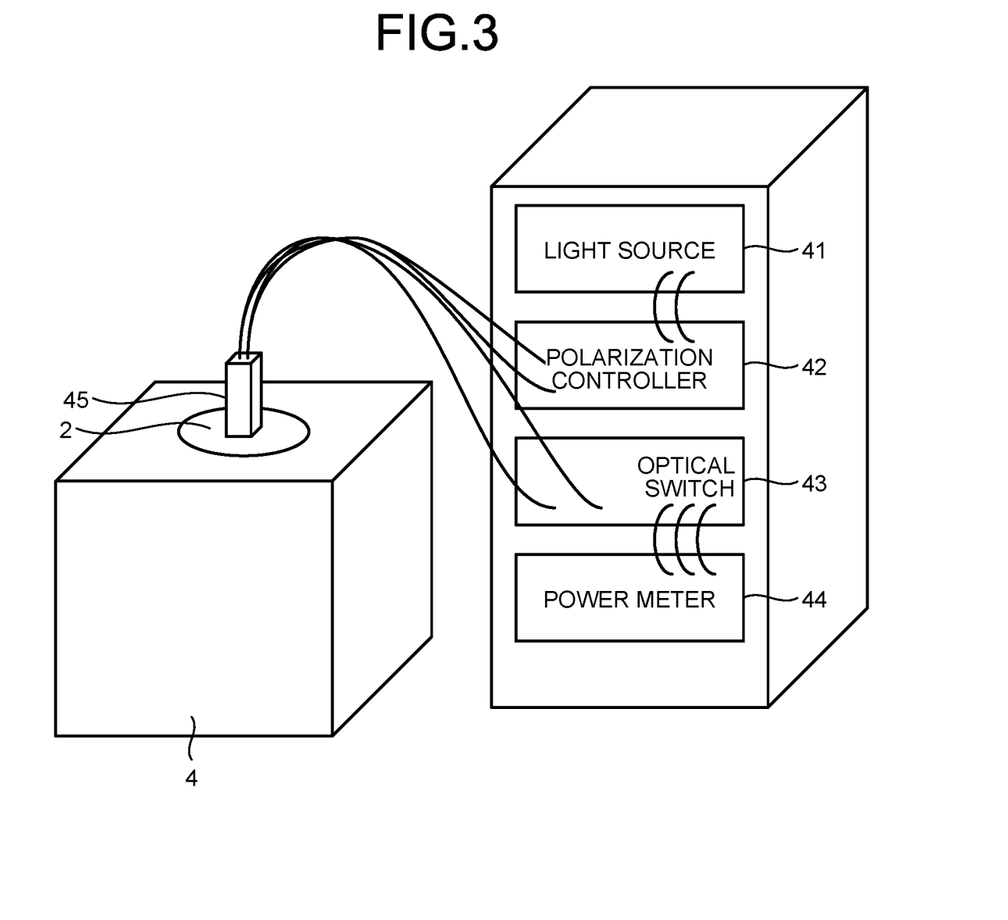
FIG. 3 is an explanatory diagram illustrating an example of a testing apparatus.

FIG. 3 is an explanatory diagram illustrating an example of the testing apparatus 3. It is assumed that the first and second light sources 41, the first and second polarization controllers 42, the first and second optical switches 43, and the power meter 44 are loaded on a rack or the like, for example.

Figure 4:
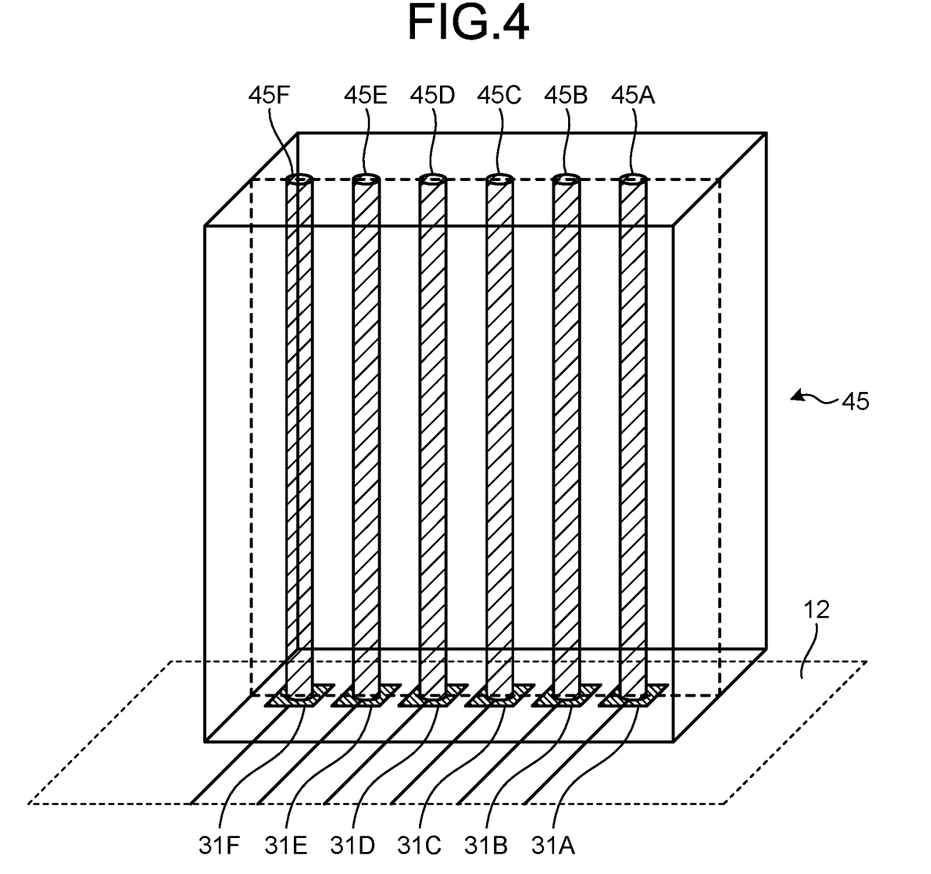
FIG. 4 is an explanatory diagram illustrating an example of an optical fiber array.

FIG. 4 is an explanatory diagram illustrating an example of the optical fiber array 45. The optical fiber array 45 illustrated in FIG. 4 has first to sixth optical fibers 45A to 45F built therein, and optically connects the first optical fiber 45A with the first GC 31A. Furthermore, the optical fiber array 45 optically connects the second optical fiber 45B with the second GC 31B, and optically connects the third optical fiber 45C with the third GC 31C. The optical fiber array 45 optically connects the fourth optical fiber 45D with the fourth GC 31D, the fifth optical fiber 45E with the fifth GC 31E, and the sixth optical fiber 45F with the sixth GC 31F. The optical fiber array 45 is a component that is capable of optically connecting the GCs 31 with the optical fibers automatically without alignment work. The optical fiber array 45 is fixed above a wafer prober 4 while being isolated from the wafer prober 4 with a prescribed distance provided therebetween, and the wafer 2 loaded on the wafer prober 4 moves up-and-down and left-and-right.

The first optical fiber 45A is an optical fiber that optically connects a first output of the first optical switch 43A with the input of the first GC 31A. The second optical fiber 45B is an optical fiber that optically connects a second output of the first optical switch 43A with the input of the second GC 31B. The third optical fiber 45C is an optical fiber that optically connects the input of the second optical switch 43B with the output of the third GC 31C. The fourth optical fiber 45D is an optical fiber that optically connects the input of the second optical switch 43B with the output of the fourth GC 31D. The fifth optical fiber 45E is an optical fiber that optically connects the input of the second optical switch 43B with the output of the fifth GC 31E. The sixth optical fiber 45F is an optical fiber that optically connects the output of the second polarization controller 42B with the input of the sixth GC 31F.

The test circuit 12 includes the first to sixth GCs 31, first to sixth branch couplers 32, first to third combiner/splitters 33, and first to third polarization rotators (PRs) 34. The first to sixth GCs 31 are arranged on the test circuit 12 at prescribed intervals. The first GC 31A is a device that is connected to the input of the reception light port 22 via an optical waveguide, and couples the first test light from the first optical fiber 45A within the optical fiber array 45 to the optical waveguide. The second GC 31B is a device that is connected to the input of the reception light port 22 via an optical waveguide, and couples the first test light from the second optical fiber 45B within the optical fiber array 45 to the optical waveguide. The sixth GC 31F is a device that is connected to the input of the local light port 21 via an optical waveguide, and couples the second test light from the sixth optical fiber 45F within the optical fiber array 45 to the optical waveguide. The third GC 31C is a device that is connected to an optical waveguide, and couples the first reference light from the optical waveguide to the third optical fiber 45C within the optical fiber array 45. The fourth GC 31D is a device that is connected to an optical waveguide, and couples the first reference light from the optical waveguide to the fourth optical fiber 45D within the optical fiber array 45. The fifth GC 31E is a device that is connected to an optical waveguide, and couples the second reference light from the optical waveguide to the fifth optical fiber 45E within the optical fiber array 45. The GC 31 includes a grating unit for guiding emission light to the optical fiber, for example. The first to sixth GCs 31 have almost the same light loss amount. The first to sixth branch couplers 32 are symmetrical couplers that include 1×2 input/output ports, and the output port ratio thereof is 1:1. The first to sixth branch couplers 32 have almost the same light loss amount.

The first to third combiner/splitters 33 are Polarization Beam Splitter (PBS)/Polarization Beam Combiner (PBC), for example, including 2×2 input/output ports. The first to third combiner/splitters 33 have almost the same light loss amount. The first to third PRs 34 include 1×1 input/output ports, and polarize the reception light of TE-polarization to the reception light of TM-polarization when the input light is the reception light of TE-polarization, for example, while polarizing the reception light of TM-polarization to the reception light of TE-polarization when the input light is the reception light of TM-polarization. The first to third PRs 34 have almost the same light loss amount.

It is assumed that the propagation loss of the optical waveguide from the first GC 31A to the third GC 31C and that of the optical waveguide from the first GC 31A to the reception light port 22 in a unit of prescribed distance are almost the same. It is assumed that the length of the optical waveguide from the first GC 31A to the third GC 31C is twice the length of the optical waveguide from the first GC 31A to the reception light port 22.

It is assumed that the propagation loss of the optical waveguide from the second GC 31B to the fourth GC 31D and that of the optical waveguide from the second GC 31B to the reception light port 22 in a unit of prescribed distance are almost the same. It is assumed that the length of the optical waveguide from the second GC 31B to the fourth GC 31D is twice the length of the optical waveguide from the second GC 31B to the reception light port 22.

It is assumed that the propagation loss of the optical waveguide from the sixth GC 31F to the fifth GC 31E and that of the optical waveguide from the sixth GC 31F to the local light port 21 in a unit of prescribed distance are almost the same. It is assumed that the length of the optical waveguide from the sixth GC 31F to the fifth GC 31E is twice the length of the optical waveguide from the sixth GC 31F to the local light port 21.

The first GC 31A is connected to the output of the first optical switch 43A of the testing apparatus 3, and receives the first test light corresponding to the reception light from the first optical switch 43A. Note that the first test light corresponding to the reception light of the first GC 31A is the test light used when evaluating the reception light of TE-polarization. The second GC 31B is connected to the output of the first optical switch 43A of the testing apparatus 3, and receives the first test light from the first optical switch 43A. Note that the first test light corresponding to the reception light of the second GC 31B is the test light used when evaluating the reception light of TM-polarization. The first optical switch 43A is the switch that outputs, in a switchable manner, the first test light from the testing apparatus 3 to the first GC 31A or to the second GC 31B.

The third GC 31C is connected to the input of the second optical switch 43B within the testing apparatus 3, and outputs the first reference light for the first test light corresponding to the first GC 31A to the second optical switch 43B. Note that the first reference light corresponding to the reception light of the third GC 31C is the reference light for evaluating the reception light of TE-polarization. The fourth GC 31D is connected to the input of the second optical switch 43B, and outputs the first reference light for the first test light corresponding to the second GC 31B to the second optical switch 43B. Note that the first reference light corresponding to the reception light of the fourth GC 31D is the reference light for evaluating the reception light of TM-polarization. The second optical switch 43B is the switch that outputs the reference light in a switchable manner.

The sixth GC 31F is connected to the output of the second polarization controller 42B within the testing apparatus 3, and receives the second test light corresponding to the local light from the second polarization controller 42B. Note that the second test light corresponding to the local light of the sixth GC 31F is the test light used when evaluating the local light. The fifth GC 31E is connected to the input of the second optical switch 43B, and outputs the second reference light for the second test light corresponding to the sixth GC 31F to the second optical switch 43B. Note that the second reference light corresponding to the local light of the fifth GC 31E is the reference light used when evaluating the local light.

The first branch coupler 32A is connected to the output of the first GC 31A, and receives the first test light from the first GC 31A. The first branch coupler 32A is connected to the input of the first combiner/splitter 33A and the input of the second combiner/splitter 33B, and branches and outputs the first test light from the first GC 31A to the first combiner/splitter 33A and to the second combiner/splitter 33B. Note that the output branch ratio of the first branch coupler 32A is 1:1.

The second branch coupler 32B is connected to the output of the second GC 31B, and receives the first test light from the second GC 31B. The second branch coupler 32B is connected to the input of the first PR 34A and the input of the second PR 34B, and branches and outputs the first test light from the second GC 31B to the first PR 34A and to the second PR 34B. Note that the output branch ratio of the second branch coupler 32B is 1:1.

The first PR 34A is connected to a first output of the second branch coupler 32B, and performs TM-polarization on the first test light branched and output from the second branch coupler 32B. The first PR 34A is connected to the input of the first combiner/splitter 33A, and outputs the first test light of TM-polarization to the first combiner/splitter 33A.

The first combiner/splitter 33A is connected to an output of the first branch coupler 32A, and receives the first test light of TE-polarization branched and output from the first branch coupler 32A. The first combiner/splitter 33A is connected to the output of the first PR 34A, and receives the first test light of TM-polarization output from the first PR 34A. Furthermore, the first combiner/splitter 33A is connected to the reception light port 22 within the optical circuit 11, and combines the first light of TE-polarization from the first branch coupler 32A and the first test light of TM-polarization from the first PR 34A. The first combiner/splitter 33A outputs the combined first test light to the reception light port 22.

The second PR 34B is connected to a second output of the second branch coupler 32B, and performs TM-polarization on the first test light of TE-polarization branched and output from the second branch coupler 32B. The second PR 34B is connected to the input of the second combiner/splitter 33B, and outputs the first test light of TM-polarization to the second combiner/splitter 33B.

The second combiner/splitter 33B is connected to a second output of the first branch coupler 32A, and receives the first test light of TE-polarization branched and output from the first branch coupler 32A. The second combiner/splitter 33B is connected to the output of the second PR 34B, and receives the polarized first test light of TM-polarization output from the second PR 34B. Furthermore, the second combiner/splitter 33B is connected to the input of the third combiner/splitter 33C, combines the first test light of TE-polarization and the first test light of TM-polarization, and outputs the combined first test light to the third combiner/splitter 33C.

The third combiner/splitter 33C is connected to the output of the second combiner/splitter 33B, and receives the first test light from the second combiner/splitter 33B. The third combiner/splitter 33C is connected to the input of the third branch coupler 32C and the input of the third PR 34C, and splits the first test light from the second combiner/splitter 33B into the first test light of TE-polarization and the first test light of TM-polarization. Then, the third combiner/splitter 33C outputs the first test light of TE-polarization to the third branch coupler 32C, and outputs the first test light of TM-polarization to the third PR 34C. The third PR 34C is connected to a second output of the third combiner/splitter 33C, receives the first test light of TM-polarization split and output from the third combiner/splitter 33C, and performs TE-polarization on the first test light of the TM-polarization. The third PR 34C is connected to the input of the fourth branch coupler 32D, and outputs the first test light of TE-polarization to the fourth branch coupler 32D.

The third branch coupler 32C is connected to a first output of the third combiner/splitter 33C, and receives the first test light of TE-polarization split and output from the third combiner/splitter 33C. The third branch coupler 32C is connected to the input of the third GC 31C, and outputs the first test light of TE-polarization to the third GC 31C as the first reference light. The fourth branch coupler 32D is connected to the output of the third PR 34C, and outputs the first test light of TE-polarization from the third PR 34C to the fourth GC 31D.

The sixth branch coupler 32F is connected to the output of the sixth GC 31F, and receives the second test light corresponding to the local light from the sixth GC 31F. The sixth branch coupler 32F is connected to the input of the fifth branch coupler 32E and the local light port 21 in the optical circuit 11, and branches and outputs the second test light to the fifth branch coupler 32E and the local light port 21. Note that the output branch ratio of the sixth branch coupler 32F is 1:1.

The fifth branch coupler 32E is connected to a second output of the sixth branch coupler 32F and receives the second test light branched and output from the fifth branch coupler 32E, while being connected to the input of the fifth GC 31E and inputting the second test light to the fifth GC 31E as the second reference light. Furthermore, the fifth GC 31E is connected to the output of the fifth branch coupler 32E and receives the second reference light, while being connected to the input of the second optical switch 43B and outputting the second reference light to the second optical switch 43B.

The second optical switch 43B outputs, in a switchable manner, the first reference light corresponding to the first GC 31A from the third GC 31C, the first reference light corresponding to the second GC 31B from the fourth GC 31D, and the second reference light corresponding to the sixth GC 31F from the fifth GC 31E to the power meter 44. The power meter 44 can measure the power of the first reference light corresponding to the first GC 31A, the first reference light corresponding to the second GC 31B, and the second reference light corresponding to the sixth GC 31F according to the switching operations of the second optical switch 43B.

Next, operations of the testing system 1 according to the embodiment will be described. First, the wafer 2 is loaded on the wafer prober 4. Then, by moving the test circuits 12 in the optical chips 10 on the wafer 2, a testing operation is started in a state where the first to sixth GCs 31A to 31F in the test circuit 12 and the first to sixth optical fibers 45A to 45F in the optical fiber array 45 are optically connected.

The first polarization controller 42A performs TE-polarization on the first test light from the first light source 41A, and inputs the first test light of TE-polarization to the first optical switch 43A. The first optical switch 43A inputs the first test light of TE-polarization to the first GC 31A and the second GC 31B according to the witching operation. Since the first test light of TE-polarization is input to the first GC 31A or the second GC 31B, the coupling loss can be suppressed.

First, the first GC 31A outputs the input first test light of TE-polarization to the first branch coupler 32A. The first branch coupler 32A branches and outputs the first test light of TE-polarization to the first combiner/splitter 33A and the second combiner/splitter 33B. The second GC 31B outputs the input first test light of TE-polarization to the second branch coupler 32B. The second branch coupler 32B branches and outputs the first test light of TE-polarization to the first PR 34A and the second PR 34B. The first PR 34A performs TM-polarization on the first test light of TE-polarization branched and output from the second branch coupler 32B, and outputs the first test light of TM-polarization to the first combiner/splitter 33A. Then, the first combiner/splitter 33A combines the first test light of TE-polarization from the first branch coupler 32A and the first test light of TM-polarization from the first PR 34A, and outputs the combined first test light to the reception light port 22 within the optical circuit 11.

The second PR 34B performs TM-polarization on the first test light of TE-polarization branched and output from the second branch coupler 32B, and outputs the first test light of TM-polarization to the second combiner/splitter 33B. The second combiner/splitter 33B combines the first test light of TE-polarization from the first branch coupler 32A and the first test light of TM-polarization from the second PR 34B, and outputs the combined first test light to the third combiner/splitter 33C.

The third combiner/splitter 33C splits the polarization of the first test light from the second combiner/splitter 33B, and outputs the split first test light of TE-polarization to the third branch coupler 32C while outputting the split first test light of TM-polarization to the third PR 34C. The third PR 34C performs TE-polarization on the first test light of TM-polarization from the third combiner/splitter 33C, and outputs the first test light of TE-polarization to the fourth branch coupler 32D.

The third branch coupler 32C outputs the first test light of TE-polarization from the third combiner/splitter 33C to the third GC 31C. Note that the third GC 31C outputs the first reference light for the first test light corresponding to the first GC 31A. Furthermore, the fourth branch coupler 32D outputs the first test light of TE-polarization from the third PR 34C to the fourth GC 31D. Note that the fourth GC 31D outputs the first reference light for the first test light corresponding to the second GC 31B.

Furthermore, the second polarization controller 42B performs TE-polarization on the second test light corresponding to the local light from the second light source 41B, and outputs the second test light of TE-polarization to the sixth GC 31F via the sixth optical fiber 45F. The sixth GC 31F outputs the second test light of TE-polarization to the sixth branch coupler 32F. The sixth branch coupler 32F branches and outputs the second test light of TE-polarization to the local light port 21 of the optical circuit 11 and the fifth branch coupler 32E. The fifth branch coupler 32E outputs the second test light of TE-polarization from the sixth branch coupler 32F to the fifth GC 31E. Note that the fifth GC 31E outputs the second reference light for the second test light corresponding to the sixth GC 31F.

That is, the third GC 31C outputs the first reference light corresponding to the first GC 31A, the fourth GC 31D outputs the first reference light corresponding to the second GC 31B, and the fifth GC 31E outputs the second reference light corresponding to the sixth GC 31F. The second optical switch 43B outputs, in a switchable manner, the first reference light from the third GC 31C, the first reference light from the fourth GC 31D, and the second reference light from the fifth GC 31E to the power meter 44 according to the switching operation.

The power meter 44 can measure the output powers of the first reference light corresponding to the reception light of TE-polarization, the first reference light corresponding to reception light of TM-polarization, and the second reference light corresponding to the local light according to the switching operations of the second optical switch 43B.

Then, the powers of the reference light for each of the optical chips 10 on the wafer 2, such as the powers of the reference light for each of the optical chips 10, are measured in a unit of column from left to right in FIG. 2, and the measurement result is evaluated. When the measurement and evaluation operations on the power of the reference light from the entire optical chips 10 in a unit of column are completed, the entire optical chips 10 in a unit of column are diced along the dicing lines 13. Then, the measurement operation on the power of reference light from each of the optical chips 10 in a unit of next column is started, and it is continued until the measurement operations for the entire optical chips 10 on the wafer 2 are completed. Furthermore, by dicing the optical chips 10 on the wafer 2 along the respective dicing lines 13, it is possible to acquire the optical chips 10 each having only the optical circuit 11 included therein by dividing the optical circuits 11 and the test circuits 12 within the optical chips 10.

Figure 5:
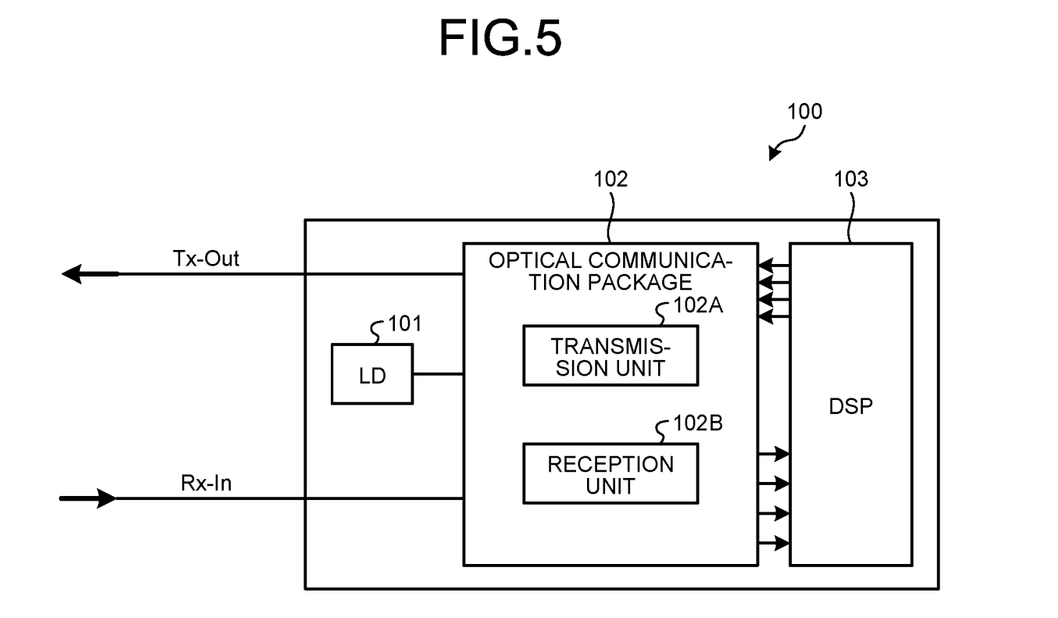
FIG. 5 is a block diagram illustrating an example of an optical communication device on which an optical chip is loaded.

FIG. 5 is an explanatory diagram illustrating an example of an optical communication device 100. The optical communication device 100 illustrated in FIG. 5 includes an LD 101, an optical communication package 102, and a DSP 103. The LD 101 is a local light source that emits local light. The optical communication package 102 is a digital coherent transmitter/receiver, for example. The optical communication package 102 includes a transmission unit 102A that transmits signal light, and a reception unit 102B that receives signal light. The reception unit 102B is the optical chip 10 after cutting off the test circuit 12, such as a digital coherent receiver, for example. The DSP 103 performs digital conversion of each electric signal input from first to fourth output ports 28A to 28D within the reception unit 102B. The DSP 103 performs digital signal processing on the digital-converted I-component and Q-component in the X-polarization components and I-component and the Q-component in the Y-polarization component so as to demodulate the X-polarization component and the Y-polarization component into demodulation signals.

Note that the coupling loss of GC needs to be taken into consideration when using GC, so that the GC may be taken out after a part of the test light input to the GC is branched by a tap coupler, and the value measured by the power meter may be taken as the reference light. The value acquired by subtracting the loss caused by branching by the tap coupler and the propagation loss of the optical waveguide from the value of the reference light is the loss for two GCs.

However, since the output branch ratio of the tap waveguide varies depending on the polarization, the powers of the reference light also vary between TE-light and TM-light. Furthermore, the output branch ratio of the tap waveguide depends on the wavelength, so that the tap waveguide needs to be designed such that light of both polarization waves is branched with the output branch ratio used for measurement in all wavelength range. Furthermore, in the measurement using the GC, the loss from the GC to the optical chip is takes as calibration data, and the value acquired by subtracting the calibration data from the actually measured loss is considered the loss of the optical chip. The measurement value needs to be calibrated by taking the output branch ratio of the tap coupler, the propagation loss of the optical waveguide, and the like into consideration, thereby resulting in complicating calibration and deteriorating the measurement precision.

In the meantime, with the embodiment, the branch couplers 32 such as the first branch coupler 32A, the second branch coupler 32B, and the sixth branch coupler 32F are disposed not on the tap waveguide but on an output stage of the input GCs 31 such as the first GC 31A, the second GC 31B, and the sixth GC 31F. Furthermore, on an input stage of the reference GCs 31 such as the third GC 31C, the fourth GC 31D, and the fifth GC 31E, for example, the branch couplers 32 such as the third branch coupler 32C, the fourth branch coupler 32D, and the fifth branch coupler 32E are disposed, for example. Furthermore, it is designed such that the total extended length of the optical waveguide from the input GCs 31 to the reference GCs 31 becomes twice the total extended length of the optical waveguide from the input GCs 31 to the optical circuit 11. As a result, since the first to sixth branch couplers 32 use 1×2 input/output ports, the output branch ratio does not depend on the wavelength, thereby improving the measurement precision. Furthermore, without using the tap coupler, calibration can be done easily and the measurement precision can be improved by inserting the same branch coupler 32 before the reference GC 31 as well. Moreover, tests of the optical chips 10 handling polarized multiplex signals can be performed with high precision in a state of the wafer 2.

As for the optical chip 10 of the embodiment, the branch coupler 32 is connected to the input GC 31, a first output of the branch coupler 32 is connected to the optical circuit 11, and a second output of the branch coupler 32 is connected to the reference GC 31. For example, the sixth branch coupler 32F is connected to the sixth GC 31F, a first output of the sixth branch coupler 32F is connected to the local light port 21, and a second output of the sixth branch coupler 32F is connected to the fifth GC 31E. The first branch coupler 32A is connected to the first GC 31A, a first output of the first branch coupler 32A is connected to the reception light port 22, and the second output of the first branch coupler 32A is connected to the third GC 31C. The second branch coupler 32B is connected to the second GC 31B, the first output of the second branch coupler 32B is connected to the reception light port 22, and the second output of the second branch coupler 32B is connected to the fourth GC 31D. That is, the branch coupler 32 has the output branch ratio of 1:1 for all the wavelengths and in both TE and TM polarized waves, so that the optical power input to the optical circuit 11 as the measurement target and the optical power input to the reference GC 31 become equivalent regardless of the wavelengths and polarized waves. As a result, calibration becomes easy and the measurement precision is improved.

For example, the second test light passes through a single branch coupler 32 (the sixth branch coupler 32F) between the sixth GC 31F and the local light port 21. In the meantime, the second reference light for the second test light passes through two branch couplers 32 (the fifth branch coupler 32E and the sixth branch coupler 32F) between the sixth GC 31F and the fifth GC 31E. That is, as for the loss of the second test light, a half of the loss of the second reference light can be taken as the calibration data.

For example, the first test light corresponding to the reception light of TE-polarization passes through a single branch coupler 32 (the first branch coupler 32A) between the first GC 31A and the reception light port 22. In the meantime, the first reference light for the first test light corresponding to the reception light of TE-polarization passes through two branch couplers 32 (the first branch coupler 32A and the third branch coupler 32C) between the first GC 31A and the third GC 31C. That is, as for the loss of the first test light corresponding to the reception light of TE-polarization, a half of the loss of the first reference light can be taken as the calibration data.

For example, the first test light corresponding to the reception light of TM-polarization passes through a single branch coupler 32 (the second branch coupler 32B) between the second GC 31B and the reception light port 22. In the meantime, the first reference light for the first test light corresponding to the reception light of TM-polarization passes through two branch couplers 32 (the second branch coupler 32B and the fourth branch coupler 32D) between the second GC 31B and the fourth GC 31D. That is, as for the loss of the first test light corresponding to the reception light of TM-polarization, a half of the loss of the first reference light can be taken as the calibration data.

For example, the first test light corresponding to the reception light of TE-polarization passes through a single combiner/splitter 33 (the first combiner/splitter 33A) between the first GC 31A and the reception light port 22. In the meantime, the first reference light for the first test light corresponding to the reception light of TE-polarization passes through two combiner/splitters 33 (the second combiner/splitter 33B and the third combiner/splitter 33C) between the first GC 31A and the third GC 31C. That is, even when it is not possible to disregard the loss of the combiner/splitter 33, as for the loss of the first test light corresponding to the reception light of TE-polarization, a half of the loss of the first reference light can be taken as the calibration data.

For example, the first test light corresponding to the reception light of TE-polarization passes through a single PR 34 (the first PR 34A) between the first GC 31A and the reception light port 22. In the meantime, the first reference light for the first test light corresponding to the reception light of TE-polarization passes through two PRs 34 (the second PR 34B and the third PR 34C) between the first GC 31A and the third GC 31C. That is, even when it is not possible to disregard the loss of the PR 34, as for the loss of the first test light corresponding to the reception light of TE-polarization, a half of the loss of the first reference light can be taken as the calibration data.

It is assumed that the length of the optical waveguide from the first GC 31A to the third GC 31C is twice the length of the optical waveguide from the first GC 31A to the reception light port 22. It is assumed that the length of the optical waveguide from the second GC 31B to the fourth GC 31D is twice the length of the optical waveguide from the second GC 31B to the reception light port 22. Furthermore, it is assumed that the length of the optical waveguide from the sixth GC 31F to the fifth GC 31E is twice the length of the optical waveguide from the sixth GC 31F to the local light port 21. As a result, even when it is not possible to disregard the loss of the optical waveguide, as for the loss of the test light, a half of the loss of the reference light can be taken as the calibration data.

The test circuit 12 includes: the first GC 31A that receives the first test light from the surface of the test circuit 12; and the third GC 31C that outputs the first test light as the first reference light from the surface of the test circuit 12. That is, the GCs 31 are disposed on the surface of the test circuit 12, so that tests of the optical chips 10 can be performed with high precision in a state of the wafer 2.

For example, the second reference light for the second test light LO—in corresponding to the local light passes through two branch couplers 32 (the sixth branch coupler 32F and the fifth branch coupler 32E) between the sixth GC 31F and the fifth GC 31E. In the meantime, the second test light corresponding to the local light passes through a single branch coupler 32 (the sixth branch coupler 32F) between the sixth GC 31F and the local light port 21. As a result, as for the loss of the second test light corresponding to the local light, a half of the loss of the second reference light can be taken as the calibration data.

Furthermore, the first reference light for the first test light Rx-TE-in corresponding to the reception light of TE-polarization passes through two branch couplers 32 (the first branch coupler 32A and the third branch coupler 32C) and two combiner/splitters 33 (the second combiner/splitter 33B and the third combiner/splitter 33C) between the first GC 31A and the third GC 31C. In the meantime, the first test light corresponding to the reception light of TE-polarization passes through a single branch coupler 32 (the first branch coupler 32A) and a single combiner/splitter 33 (the first combiner/splitter 33A) between the first GC 31A and the reception light port 22. As a result, as for the loss of the first test light corresponding to the reception light of TE-polarization, a half of the loss of the first reference light can be taken as the calibration data.

Furthermore, the first reference light for the first test light Rx-TM-in corresponding to the reception light of TM-polarization passes through two branch couplers 32 (the second branch coupler 32B and the fourth branch coupler 32D), two PRs 34 (the second PR 34B and the third PR 34C), and two combiner/splitters 33 (the second combiner/splitter 33B and the third combiner/splitter 33C) between the second GC 31B and the fourth GC 31D. In the meantime, the first test light corresponding to the reception light of TM-polarization passes through a single branch coupler 32 (the second branch coupler 32B), a single PR 34 (the first PR 34A), and a single combiner/splitter 33 (the first combiner/splitter 33A) between the second GC 31B and the reception light port 22. As a result, as for the loss of the first test light corresponding to the reception light of TM-polarization, a half of the loss of the first reference light can be taken as the calibration data.

As for the test circuit 12, the first GC 31A, the second GC 31B, the third GC 31C, and the fourth GC 31D are disposed on the surface of the test circuit 12 at equivalent intervals. Therefore, since the GCs 31 are used in the test circuit 12, it is possible to emit the test light by bringing the optical fiber array 45 close to the GCs 31 from the direction of the surface of the wafer to input the test light to the optical circuit 11. As a result, tests can be done in a wafer state. This makes it possible to perform evaluation using the optical fiber array 45, so that adjustment of the optical axis at the time of evaluation becomes easy.

For the sake of explanation, it has been referred to the case of disposing the first PR 34A between the second branch coupler 32B and the first combiner/splitter 33A, disposing the second PR 34B between the second branch coupler 32B and the second combiner/splitter 33B, and disposing the third PR 34C between the third branch coupler 32C and the third combiner/splitter 33C. However, the first PR 34A, the second PR 34B, and the third PR 34C may be omitted, and modifications thereof are also possible as appropriate.

Furthermore, it has been referred to the case where the optical fiber array 45 is fixed above the wafer prober 4, and the wafer 2 loaded on the wafer prober 4 is moved up-and-down and left-and-right with respect to the optical fiber array 45. However, the optical fiber array 45 may move up-and-down and left-and-right over the wafer 2, and modifications thereof are also possible as appropriate.

Furthermore, while it has been referred to the case where the optical circuit 11 is a digital coherent light reception circuit, the optical circuit 11 is not limited to the digital coherent type. Other types of light reception circuit may be used, and modifications thereof are also possible as appropriate. Furthermore, the optical circuit 11 is not limited to a light reception circuit but may be a light transmission circuit, and modifications thereof are also possible as appropriate.

Furthermore, each structural element of each component is not necessarily need to be configured physically as it is illustrated in the drawings. That is, the specific forms of distribution/integration of each unit are not limited to those illustrated in the drawings, but a part or a whole part thereof may be configured in a distributed/integrated manner functionally or physically in an arbitrary unit according to various kinds of load, use conditions, and the like.

Furthermore, a whole part of or an arbitrary part of various kinds of processing functions performed in each device may be executed on a Central Processing Unit (CPU) (or a microcomputer such as a Micro Processing Unit (MPU), a Micro Controller Unit (MCU), or the like). Naturally, a whole part of or an arbitrary part of various kinds of processing functions may be executed on a program analyzed and executed on a CPU (or a microcomputer such as an MPU, an MCU, or the like) or on hardware by wired logic.

According to one aspect, the work efficiency is improved when measuring the power of test light with respect to the input light by optically connecting the optical chip and the testing apparatus.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical device, comprising:
    an optical circuit; and
    a test circuit optically connected to the optical circuit, wherein
    the test circuit comprises:
        a test light grating coupler configured to receive test light;
        a reference light grating coupler configured to output, as reference light, the test light passed through the test light grating coupler; and
        a test light branch coupler connected to an output of the test light grating coupler, and
    the test light branch coupler includes:
        a first output connected to an input of the optical circuit and configured to branch and output the test light from the test light grating coupler to the optical circuit, and
        a second output connected to an input of the reference light grating coupler and configured to branch and output the test light from the test light grating coupler to the reference light grating coupler.

2. The optical device according to claim 1, wherein the test circuit comprises a reference light branch coupler connected to an input of the reference light grating coupler, and
    the reference light branch coupler is connected to the second output of the test light branch coupler and configured to output the test light from the test light branch coupler to the reference light grating coupler.

3. The optical device according to claim 2, wherein the test circuit comprises:
    a single combiner/splitter connected between the first output of the test light branch coupler and the input of the optical circuit and configured to output the test light from the test light branch coupler to the optical circuit; and
    two combiner/splitters connected between the second output of the test light branch coupler and the input of the reference light grating coupler and configured to output the test light from the test light branch coupler to the reference light grating coupler.

4. The optical device according to claim 2, wherein the test circuit comprises:
    a single polarization rotator connected between the first output of the test light branch coupler and the input of the optical circuit and configured to rotate a polarization of a beam on the test light from the test light branch coupler and output the polarized test light to the optical circuit; and
    two polarization rotators connected between the second output of the test light branch coupler and the input of the reference light grating coupler and configured to rotate the polarization of the beam on the test light from the test light branch coupler and output the polarized test light to the reference light grating coupler.

5. The optical device according to claim 1, wherein a length of an optical waveguide from the test light grating coupler to the reference light grating coupler is twice a length of an optical waveguide from the test light grating coupler to the optical circuit.

6. The optical device according to claim 1, wherein the test circuit comprises:
    the test light grating coupler configured to receive the test light from a surface of the test circuit; and
    the reference light grating coupler configured to output the test light as the reference light from the surface of the test circuit.

7. An optical device, comprising:
    an optical circuit; and
    a test circuit optically connected to the optical circuit, wherein
    the test circuit comprises:
        a first grating coupler configured to receive test light from a surface of the test circuit;
        a second grating coupler configured to receive the test light from the surface of the test circuit;
        a third grating coupler configured to output, from the surface of the test circuit, the test light passed through the first grating coupler as reference light;
        a fourth grating coupler configured to output, from the surface of the test circuit, the test light passed through the second grating coupler as the reference light;
        a first branch coupler connected to an output of the first grating coupler;
        a second branch coupler connected to an output of the second grating coupler;
        a third branch coupler connected to an input of the third grating coupler;
        a fourth branch coupler connected to an input of the fourth grating coupler;
        a first polarization rotator connected to a first output of the second branch coupler and configured to rotate a polarization of a beam on the test light from the second branch coupler;
        a second polarization rotator connected to a second output of the second branch coupler and configured to rotate the polarization of the beam on the test light from the second branch coupler;
        a first combiner/splitter connected to a first output of the first branch coupler and to an output of the first polarization rotator and configured to combine the test light from the first branch coupler and the polarized test light from the first polarization rotator and output the combined test light to the optical circuit;

a second combiner/splitter connected to a second output of the first branch coupler and to an output of the second polarization rotator and configured to combine the test light from the first branch coupler and the polarized test light from the second polarization rotator;

a third combiner/splitter connected to an output of the second combiner/splitter and configured to split the combined test light from the second combiner/splitter into the test light from the first branch coupler and the polarized test light from the second polarization rotator;

the third branch coupler connected to a first output of the third combiner/splitter and configured to receive the split test light from the first branch coupler and output the test light to the third grating coupler; and a third polarization rotator connected to a second output of the third combiner/splitter and configured to receive the split polarized test light from the second polarization rotator, perform polarization on the test light, and output the polarized test light to the fourth grating coupler via the fourth branch coupler.

8. The optical device according to claim 7, further comprising:

the first grating coupler configured to receive test light of TE (Transverse Electric)-polarization from the surface of the test circuit;

the second grating coupler configured to receive the test light of TE-polarization from the surface of the test circuit;

the third grating coupler configured to output, from the surface of the test circuit, the test light of TE-polarization passed through the first grating coupler as reference light;

the fourth grating coupler configured to output, from the surface of the test circuit, the test light of TE-polarization passed through the second grating coupler as the reference light;

the first polarization rotator connected to the first output of the second branch coupler and configured to rotate the test light of TE-polarization from the second branch coupler to be the test light of TM (Transverse Magnetic)-polarization;

the second polarization rotator connected to the second output of the second branch coupler and configured to rotate the test light of TE-polarization from the second branch coupler to be the test light of TM-polarization;

the first combiner/splitter connected to the first output of the first branch coupler and to the output of the first polarization rotator and configured to combine the test light of TE-polarization from the first branch coupler and the test light of TM-polarization from the first polarization rotator and output the combined test light to the optical circuit;

the second combiner/splitter connected to the second output of the first branch coupler and to the output of the second polarization rotator and configured to combine the test light of TE-polarization from the first branch coupler and the test light of TM-polarization from the second polarization rotator;

the third combiner/splitter connected to the output of the second combiner/splitter and configured to split the combined test light from the second combiner/splitter into the test light of TE-polarization from the first branch coupler and the test light of TM-polarization from the second polarization rotator;

the third branch coupler connected to the first output of the third combiner/splitter and configured to receive the split test light of TE-polarization from the first branch coupler and output the test light of TE-polarization to the third grating coupler; and the third polarization rotator connected to the second output of the third combiner/splitter and configured to receive the split test light of TM-polarization from the second polarization rotator, perform TE-polarization on the test light of TM-polarization, and output the test light of TE-polarization to the fourth grating coupler via the fourth branch coupler.

9. The optical device according to claim 7, wherein the first grating coupler, the second grating coupler, the third grating coupler, and the fourth grating coupler are disposed on the surface of the test circuit at equivalent intervals.

10. A testing method for an optical device including an optical circuit and a test circuit optically connected to the optical circuit executed by a testing apparatus, the testing method comprising:

inputting test light from the testing apparatus to a test light grating coupler within the test circuit;

branching and outputting the test light from the test light grating coupler to the optical circuit and to a reference light branch coupler within the test circuit by using a test light branch coupler within the test circuit;

outputting the test light from the test light branch coupler as reference light to a reference light grating coupler within the test circuit by using the reference light branch coupler; and measuring a power of the reference light output from the reference light grating coupler.

* * * * *